United States Patent [19]

Thomas et al.

[11] Patent Number: 5,520,236
[45] Date of Patent: May 28, 1996

[54] GREENHOUSE CURTAIN SYSTEM

[75] Inventors: Berl M. Thomas, Bradenton; Robert D. Moffitt, New Smyrna Beach, both of Fla.

[73] Assignee: Speedling, Inc., Sun City, Fla.

[21] Appl. No.: 141,662

[22] Filed: Oct. 26, 1993

[51] Int. Cl.$^6$ ........................................ E06B 9/08
[52] U.S. Cl. ................ 160/120; 52/276; 52/63; 160/243; 160/40; 160/253
[58] Field of Search ..................... 160/120, 122, 160/242, 243, 246, 252, 253, 254, 40; 52/275, 276, 63; 47/17 FM, 17, 17 R; 135/903, 117

[56] References Cited

U.S. PATENT DOCUMENTS

| | | | |
|---|---|---|---|
| 164,524 | 6/1875 | Converse | 160/243 |
| 597,562 | 1/1898 | Paul et al. | 160/243 |
| 692,455 | 2/1902 | Kepler | 160/243 X |
| 862,644 | 8/1907 | Kepler | 160/243 X |
| 4,244,417 | 1/1981 | Taylor | 160/243 |

FOREIGN PATENT DOCUMENTS

| | | | |
|---|---|---|---|
| 785579 | 5/1968 | Canada | 160/243 |
| 284565 | 10/1962 | Netherlands | 160/243 |
| 432110 | 9/1987 | Switzerland | 160/243 |

*Primary Examiner*—Blair M. Johnson
*Attorney, Agent, or Firm*—Popham, Haik, Schnobrich & Kaufman, Ltd.

[57] ABSTRACT

A novel greenhouse curtain system has a plurality of movable curtains oriented vertically one above the other to form a flexible wall. Each curtain is supported by a fixed upper edge, and the vertical position of the lower extent of each curtain may be adjusted by means of a traveling spindle used to furl or unfurl the curtain. The traveling spindle rises and descends as the curtain is furled (raised) or unfurled (lowered), and is rotated by a tensioned cable wrapped in opposite directions around two drums aligned concentrically one on end of the roller bar. The cable is anchored on one end below one of the drums, and is wrapped in opposite manner respectively around both drums and passes vertically to a pulley, and then to a driving means such as a winch. The dimensions of the drums are such that the curtain remains in stable position as long as there is no movement of the cable to or from the driving means. Sealing means is engaged by each roll when the roll is lowered to its full extent to provide a weather seal.

27 Claims, 3 Drawing Sheets

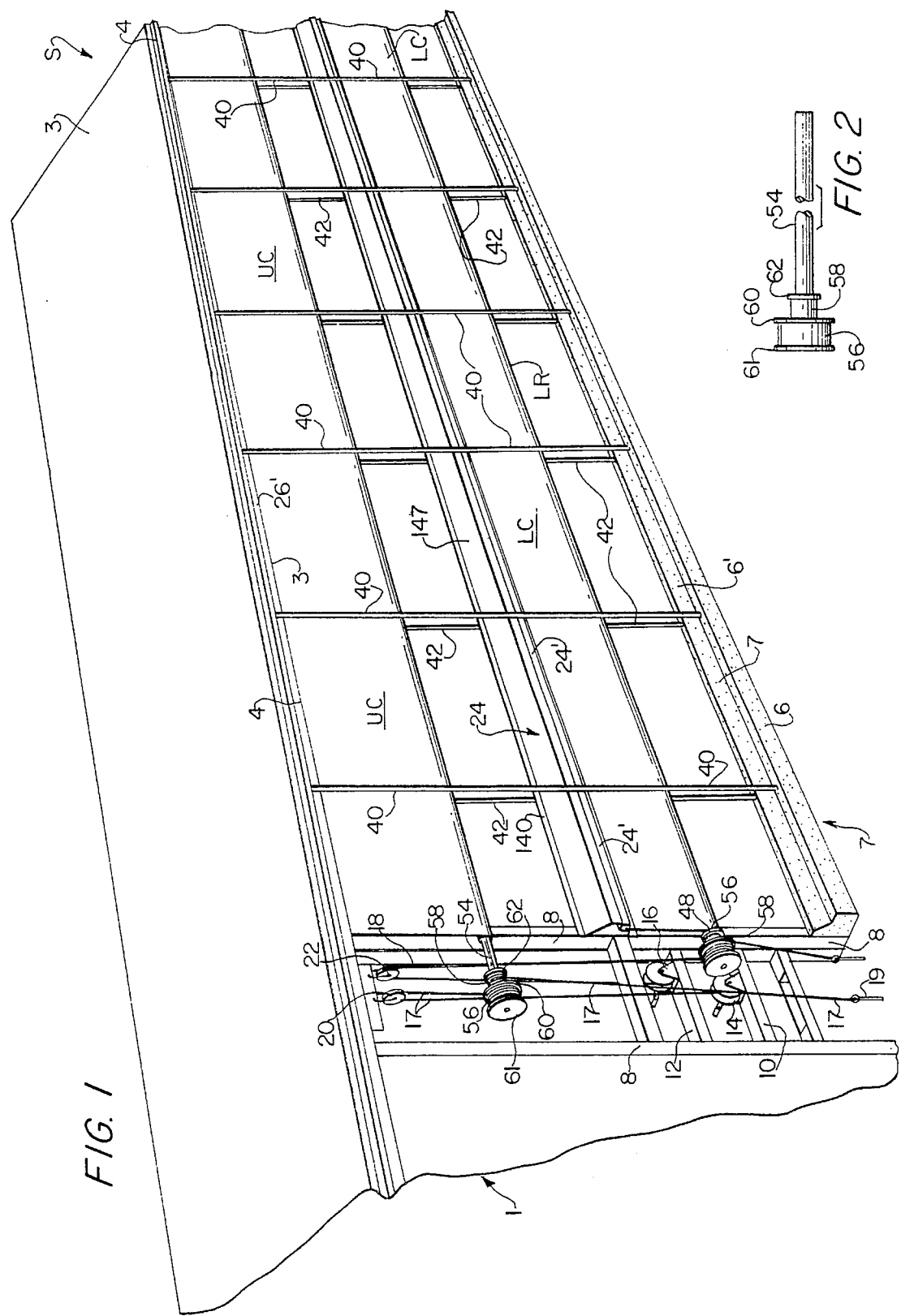

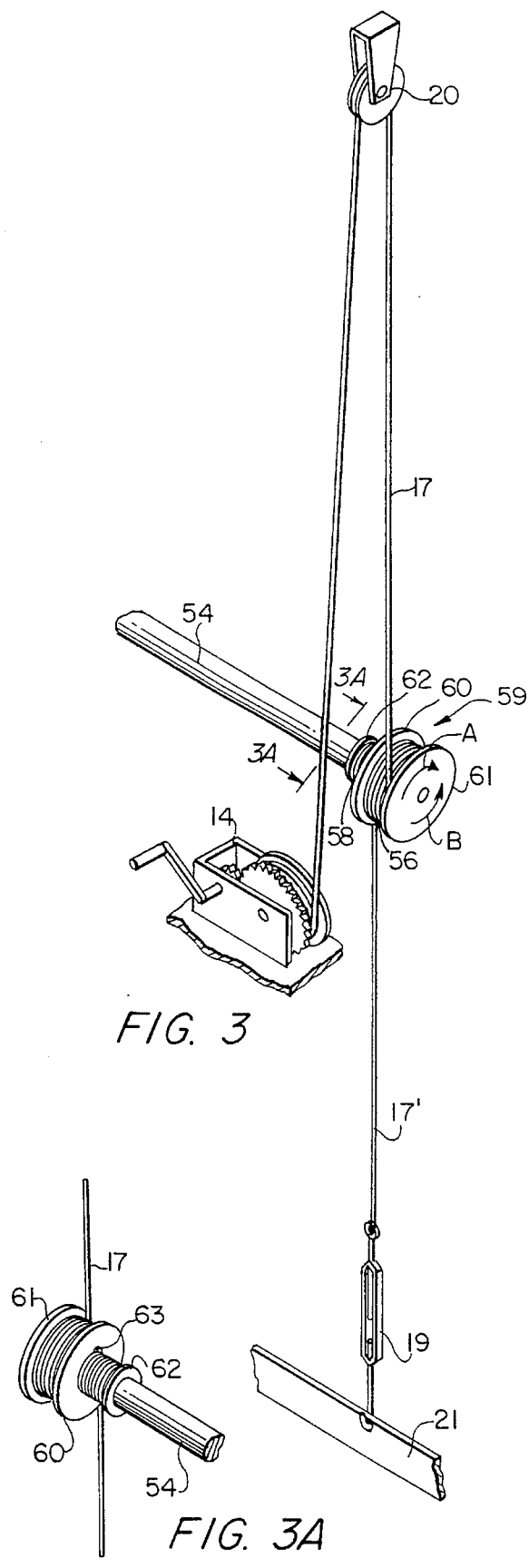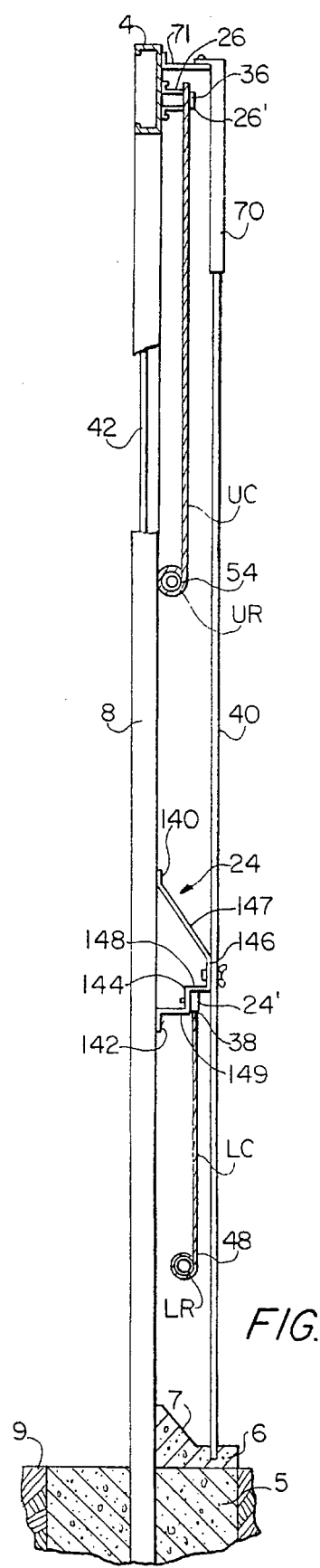

GREENHOUSE CURTAIN SYSTEM

BACKGROUND OF THE INVENTION

1. Field of the Invention

The present invention generally relates to greenhouses, and is more specifically directed to greenhouses or similar structures having flexible side curtains mounted to be raised or lowered by manual or powered means. Even more specifically, the invention relates to a unique sidewall curtain usable in greenhouses and other locations which is raised or lowered by means of a unique spindle, drum and cable system requiring a minimum amount of power and effort.

Greenhouses facilitate the maintenance of a carefully controlled environment for growing various varieties of plant life. Many species have specific weather related requirements such as temperature, humidity, lighting, and air flow conditions, and greenhouses necessarily must include means for regulating these factors. Movable curtains defining all or portions of the side walls of the greenhouse are frequently used for aid in regulating such weather related conditions. Problems may arise, however, when the scale of operation dictates the use of extremely large greenhouses. Since the area covered by a greenhouse increases, the necessary control over environmental conditions becomes much more difficult to maintain.

Solar gain resulting from the significant surface area of a large greenhouse may make temperature particularly difficult to control. Likewise, the velocity of air flow must be controlled to avoid plant damage while continuing to provide controlled air movement by adjustment of curtain positions and positions of curtains with respect to plant locations. Such a greenhouse may require expensive air moving equipment. Further, in traditional rigid-walled greenhouses, stocking the greenhouse with the great number and variety of plants that it is capable of sustaining, and removing these plants from the greenhouse for further transport becomes highly labor-intensive when access is limited by fixed walls and/or small doors or access openings in the greenhouse.

Creating an inexpensive, safe, reliable, and convenient way of solving the foregoing problems is the primary object of this invention.

SUMMARY OF THE INVENTION

The invention constitutes a novel solution to the aforementioned problems in comprising a greenhouse wall system which includes a system of one or more flexible curtains of sufficient thickness and weight to provide protection against extreme weather when closed, yet which can be opened or closed quickly and easily to allow air flow through, rain and temperature control, insect intrusion prevention and to permit loading and unloading operations through the wall area in which the curtain is provided. The curtains may be constructed of materials of varying light transparency, enabling great control over the lighting conditions within the greenhouse.

The instant invention additionally provides a means of selectively allowing climatic exchange with the external environment when to do so is propitious, and for sealing out such exchange when inexpedient. The curtain is easily raised or located by a single worker, even though the wall may be over 100 feet long and the curtain being of substantial weight.

More specifically, the present invention is provided in a greenhouse or like structure having sides and/or ends which are open except for the presence of vertical roof support columns and one or more flexible curtains, comprising an upper curtain and a lower curtain. Each curtain has an upper horizontal edge which is fixedly attached to and supported by the greenhouse frame structure so that both curtains extend the length of the side or end of the greenhouse and cooperate to define an adjustable closure wall. The upper, or larger, curtain has an upper horizontal edge fixedly mounted below the eaves of the greenhouse, and extends a maximum distance downwardly to a location approximately three to five feet above the floor of the greenhouse. The second, or smaller, curtain extends downwardly from just below the lowest possible extent of the first curtain to the floor.

Each curtain is provided at its lower edge with a horizontal cylindrical traveling spindle about which the lower part of the curtain is furled or wrapped to constitute a vertically movable lower roll of curtain material so that rotation of the spindle causes it to either reel in or reel out the curtain material relative to the lower roll. By thus changing the vertical position of the lower roll of the curtain, the extent to which the curtain covers the side or end of the greenhouse is adjusted. A novel spool is mounted on one end of the traveling spindle and is connected by a cable to a winch and pulley. The spool is comprised of a unitary smaller spool and a larger drum coaxially related to each other and the traveling spindle, and fixedly attached to one end of the traveling spindle so that rotation of the drum causes the traveling spindle to rotate in the same direction. The larger drum preferably defines the outer end of the drum and spindle assembly, with the smaller drum being located immediately outward of the smaller drum. The spindle extends horizontally through the lower roll of curtain material from the spool to the opposite end of the curtain and each drum has flanges to maintain the cable in position on the drums.

The cable is wrapped counterclockwise (as viewed from the end of the spindle on which the spool is mounted) around the smaller drum and has one end fixedly anchored to the frame of the greenhouse. The cable also extends through a wall of the larger drum onto and is wrapped clockwise around the larger drum. Clockwise and counterclockwise are defined with respect to an end view of the traveling spindle from the spool end as noted above. The cable then passes upwardly over a pulley supported by the greenhouse frame and located above both curtains, and finally downward to a winch, to which it is connected. The winch acts to retrieve the cable to cause upward curtain movement or to release (unwind) the cable to lower the curtain.

BRIEF DESCRIPTION OF THE DRAWINGS

The foregoing summary, as well as the following detailed description of a preferred embodiment of the invention, will be better understood when read in conjunction with the appended drawings, in which:

FIG. 1 is a perspective view of a curtain wall provided on one side of a greenhouse illustrating the preferred embodiment of the invention;

FIG. 2 is a front elevation view of a cylindrical traveling spindle and drum spool assembly used to raise (furl) or lower (unfurl) the curtains;

FIG. 3 is a perspective view of one of the spindle, drum spool, cable, pulley, and winch assemblies used to raise and lower the curtains;

FIG. 3a is a perspective view of the spindle, spool and cable assembly as viewed from the inner or spindle side of the spool;

FIG. 4 is a transverse sectional elevation view of the preferred embodiment curtain wall of FIG. 1;

DESCRIPTION OF THE PREFERRED EMBODIMENT

Figure 5:
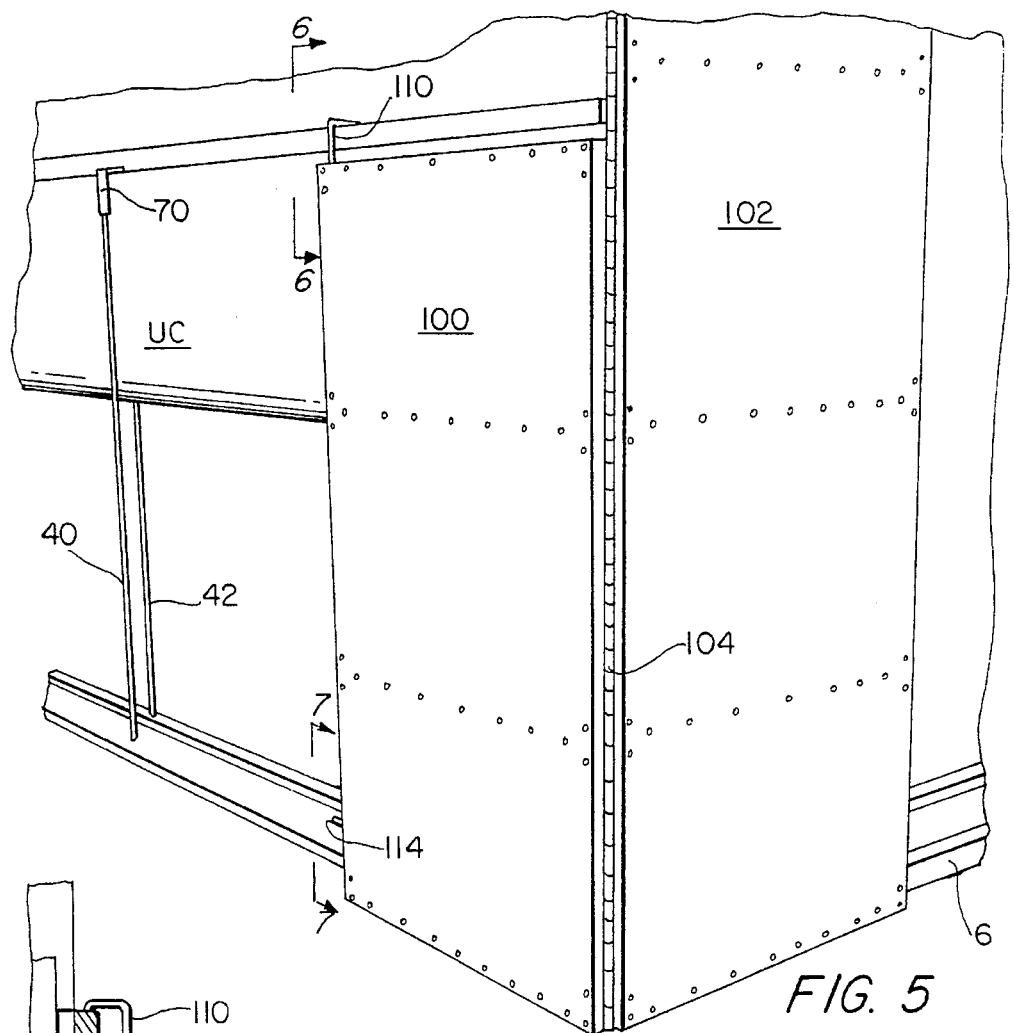
FIG. 5 is a perspective view of a corner of the greenhouse at the end of the curtain wall of FIG. 1.

Attention is initially invited to FIG. 1 of the drawings, which illustrates a portion of a greenhouse 1 having a roof 3 with a lower edge portion in the form of an upper eave channel 4 provided in general vertical alignment with a plurality of concrete footers 5 (FIG. 3) which support a curb 6 having an inclined upper surface component 7 (FIG. 4) extending lengthwise above upper surface 9 of tile surrounding soil. A plurality of square vertical hollow metal support columns 8 extend upwardly from footers 5 to support upper eave channel 4.

The space between upper eave channel 4 and curb 6 defines a side S of the greenhouse in which an upper curtain UC and a lower curtain LC are mounted in a manner to be described. It should be understood that additional vertical columns (not shown) identical to columns 8 are provided at predetermined, discrete locations along the side wall to support the roof 3.

First and second winch brace members 10 and 12 extend between vertical support columns 8 to which they are attached with first and second manual winches 14 and 16 being respectively mounted on winch brace members 10 and 12. Cables 17 and 18 are respectively mounted on and extend from winches 14 and 16 upwardly over idler pulleys 20 and 22 respectively which are supported by and below upper eave channel 4. It should also be understood that electric, automatic, computer operated or remote operated winches could be used instead of manual winches if desired.

A lower side curtain support channel beam 24 extends horizontally along the length of side S as does an upper side curtain support beam 26 which is attached to upper eave channel 4 as shown in FIG. 5. The lower side curtain support channel beam 24 is formed of 18 gauge galvanized steel and includes coplanar vertical upper and lower attachment panel portions 140 and 142 which engage and are attached to support columns 8, an intermediate vertical panel 144, an outer vertical panel 146, a canted brace panel 147 and upper and lower horizontal connector panels 148 and 149. The lower side curtain support channel beam 24 is supported by the rightmost vertical column 8 of FIG. 1 and intermediate vertical columns (not shown) which engage panels 140 and 142 and are connected thereto by screws or other suitable connectors. The upper edge portions 36 and 38 respectively of upper curtain UC and lower curtain LC are fixedly mounted to upper and lower side curtain support channel beams 26 and 24 by conventional clamping members 26' and 24' (such as, for example, those sold under the trademark POLYLOCK) provided along the length of the greenhouse to evenly distribute the weight of the curtains. Other means for securing the top edge of the curtains to the greenhouse are equally acceptable, however, and such means are not central to the concept of the invention.

The lower end of upper curtain UC is defined by an upper roll UR of curtain material wound about an upper travelling roller spindle 54 and the lower curtain LC has its lower end defined by a lower roll LR of curtain material wound on a lower travelling roller spindle 48. Both spindles extend the entire length of their respective curtains and both spindles can be rotated to cause the vertical position of rolls UR and LR to be adjusted upwardly or downwardly by the winding or unwinding of the curtains on the spindles.

The upper and lower curtains UC and LC are preferably constructed from a heavy but flexible polymeric material to avoid wind damage. In order to restrain the upper curtain UC and the lower curtain LC from excessive wind movement, a plurality of external vertical curtain retainers 40 in the form of rods or tubes are disposed at spaced intervals outside of the curtains along the length of side S of the greenhouse 1. The external vertical curtain retainer rod 40 are preferably formed of ¾" galvanized conduit and are normally parallel to the upper and lower curtains UC and LC. A vertical hollow cylindrical sleeve 70 has an internal diameter greater than the outer diameter of rod 40 to permit it to matingly receive the upper end of each curtain retainer rod 40; each sleeve 70 is supported at its upper end by a bracket 71 connected to upper eave channel 4 as shown in FIG. 4. The lower end of each curtain retainer rod 40 is matingly received in a cylindrical recess of greater diameter than the outer diameter of rod 40 in curb 6 (as shown in FIG. 4) into which it can be easily inserted and removed. The upper end of each curtain retainer rod 40 is positioned in the middle part of a sleeve 70, so that it can move upwardly a sufficient distance to move its lower end upwardly to be above the recess in curb 6; following which the lower end of rod 40 can be diverted outwardly from over curb 6 to permit rod 40 to be lowered, so that its upper end clears the lower end of sleeve 70 to complete disconnection of rod 40 from the greenhouse so as to permit removal or replacement of the curtains. Replacement of rods 40 in vertical sleeve 70 is effected by a reverse procedure in an obvious manner.

Additionally, similar internal vertical curtain retainer rods 42 extending between upper eave channel 4 and curb 6 are provided inwardly of curtains UC and LC for preventing inward movement of the curtains. Each internal vertical curtain retainer 42 is aligned with an external vertical curtain retainer 40. The external vertical retainer rods 40 are located on the outside of the greenhouse curtains so as to limit outward windblown deflection of the upper and lower curtains while the internal vertical curtain retainer rods 42 similarly limit inward curtain movement.

Upper curtain UC is vertically larger than the lower curtain LC and when fully lowered extends from the upper side curtain support channel beam 26 to engage the upper surface of canted brace panel 147 of side curtain support channel 24 which surface is angled down and away from the interior of the greenhouse. It should be noted that downward movement of upper roll UR will result in wedging of the roll between canted surface 147 and the vertical retainer rods 40 to provide sealing contact between the roll UR and surface 146 to prevent wind or water passage into the greenhouse. Thus, as upper side curtain UC is lowered into its lowest position, the upper roll UR rests within the nip of the V formed by the upper canted surface of panel 147 and each of the external vertical curtain retainer rod 40 so that upper roll UR is urged against inclined surface of member 147 which functions as an effective weather seal, preventing ingress of rain or wind below the curtain when the upper curtain UC is in its closed position. It should also be noted that the mounting of upper curtain UC is such that when it is in its fully elevated (rolled up) position, it is shaded by the overhang of the roof so as to be protected from the sun.

Lower side curtain LC extends from the lower side curtain support channel beam 24 to the curb 6 of greenhouse 1 when the curtain is in its fully lowered position. The stop means for lower side curtain LC is comprised of inclined surface 7 and the lower end of each external vertical curtain retainer rod 40 which define a V-shaped nip operable in the same manner as the nip provided by rod 40 and canted brace panel 147 to provide a weather seal for lower roll LR in the manner discussed above with respect to the upper roll UR.

Upper and lower side curtains UC and LC are independently raised and lowered by rotating travelling roller spindles 54 and 48, respectively, by a cable connected to a novel two-drum spool system on one end of each of the spindles 54 and 48. Roller spindles 54 and 48 are formed of 1" O.D. heavy wall pipe and extend the length of side S. Thus, spindles 54 and 48 keep upper and lower side curtains UC and LC taut along their length as they are rolled up or down. It is desirable to prevent rain from collecting between each curtain and its associated roll. Thus, each curtain is for this purpose furled inwardly toward the interior of the greenhouse 1 when being rolled upwardly by clockwise rotation of spindles 54 and 48. In other words, upper roll UR and spindle 54 are positioned inwardly of the portion of upper curtain UC above the upper roll UR, and a similar relationship is provided between lower roll LR and the portion of lower curtain LC positioned above lower roll LR as shown in FIG. 3.

The operation of the spool system for raising and lowering the top curtain is illustrated in FIGS. 1, 3 and 3A. For clarity, only the system for upper side curtain UC is shown. Both upper and lower curtains UC and LC, however, have essentially identical drive systems, which are shown together in FIG. 1. Upper travelling spindle 54 has a spool assembly 59 at one end, connected by cable 17 travelling over idler pulley 20 and connects to winch 14. Spindle 54 moves up and down vertically as the cable 17 is rolled on or off of the winch 14 so that the curtain is consequently raised or lowered.

To raise upper curtain UC, winch 14 retracts cable 17, imparting a clockwise torque to spindle 54 as shown by arrow A in FIG. 3, causing spindle 54 to rotate clockwise in the direction of arrow A and furl upper curtain UC around spindle 54. To lower the upper curtain UC, winch 14 unwinds cable 17, allowing gravity to rotate spindle 54 counterclockwise in the direction of arrow B, unfurling upper curtain UC.

The spool on spindle 54 is comprised of a larger drum 56 having a 4½" diameter and a smaller drum 58 positioned inwardly of larger drum 56 and having a 1¾" diameter. Drums 56 and 58 are unitarily attached coaxially with one another and are fixedly attached to the end of spindle 54. The smaller drum 58 is of a slightly larger diameter than spindle 54. Spindle 54 extends from spool assembly 59 through upper roll UR to the opposite side of upper curtain UC. Drum 56 includes cable retainer flanges 60 and 61 to retain the cable in position while the drum 58 has a single smaller flange 62 for the same purpose.

Cable 17 is wrapped around the drums 56 and 58 in opposite directions and an opening 63 in flange 62 permits the cable 17 to extend from drum 58 to drum 56 over which a portion of the cable is wrapped in reverse manner to the cable portion wrapped on the larger drum 56 with a lower end portion 17' of the cable extending downwardly for connection to a turnbuckle 19 anchored to fixed frame means 21.

Cable 17 is wrapped counterclockwise around the smaller drum 58, and extends through an opening in flange 60 onto drum 56 about which the cable is wrapped clockwise. Clockwise and counterclockwise are defined with respect to an end view of spindle 54 from the spool end and are respectively illustrated by arrows A and B. The cable 17 has an upper portion which passes upwardly over idler pulley 20 located above both curtains UC and LC, and finally downward to winch 14. The tension in the upper cable portion 17 extending from drum 56 to pulley 20 etc. exerts a torque that is offset by the tension in lower cable portion 17' extending downwardly from smaller drum 58 for connection through adjustment means 19 to fixed frame member 21. The tension applied by cable 17 causes the large drum 56 to rotate in direction A so that a portion of cable 17 is unwound from the large drum A; simultaneously, the rotation of the larger drum 56 tends to rotate the smaller drum 58 to cause the lower end 17' of the cable to unwind from the smaller drum 58. Both the smaller drum and the larger drum obviously rotate the same number of degrees; however, the larger drum will obviously reel off more of cable 17 than the small drum will reel off of cable 17'. The difference between the amount of cable 17 reeled off of the larger drum 56 and the amount of cable 17' reeled off of the smaller drum 58 equals the amount of vertical displacement that the traveling spindle 54 will make in an upward direction when the cable 17 is being wound onto the wench 14. The exact reverse operation is true during the lowering of the spindle 54 as occurs when the wench 14 is operated to release cable 17 from the wench so that spindle assembly 59 rotates in the direction of arrow B to reel cable 17' onto the smaller drum 58 with the difference in the amount of cable reeled on to smaller drum 58 and the amount reeled onto larger drum 56 being equal to the amount of vertical lowering movement of spindle 54. Thus, spindle 54 is held in stable position unless the tension in portion 17 is increased or decreased by activating or releasing winch 14.

The above wrapping directions are preferred when, as shown in FIG. 1, the drum spool is located at the left end of the curtain, viewed from the exterior of the greenhouse. The foregoing arrangement will result in the curtain 36 being furled to the inside. When the drum spool is located on the other end of the curtain, the cable should be wrapped in a reverse manner, i.e., clockwise around the smaller drum 58 and counterclockwise around the larger drum 56.

Figure 6:
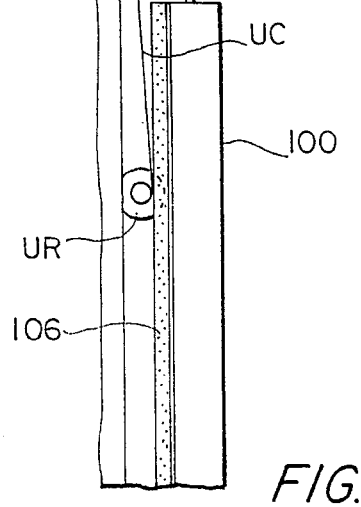
FIG. 6 is a section view taken along lines 6—6 of FIG. 5.
Figure 7:
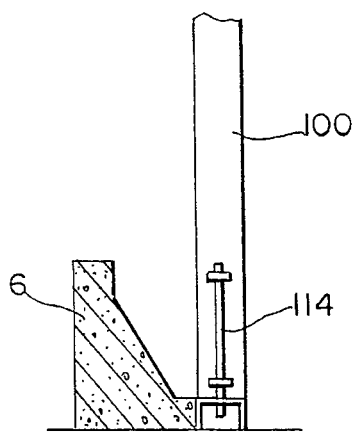
FIG. 7 is a section view taken along lines 7—7 of FIG. 5.

FIG. 5 illustrates corner closer doors 100 and 102, which are supported by corner hinge means 104, so that they can be moved to the closed position illustrated in FIG. 5 in which they overlie the ends of curtain means, such as the upper curtain UC. When the doors are closed, they prevent wind from blowing in and behind the curtains, which would cause the curtains to billow outwardly and create heat loss within the greenhouse. Each door is provided with a vertical foam rubber (or the like) seal 106 extending, substantially, the entire height of the door, as shown in FIG. 6. When the door is closed, seal 106 engages the front surface of the curtain or curtains as shown in FIG. 6 so as to keep wind and precipitation from entering into the space behind the door and traveling into the greenhouse. Additionally, each door is provided with an upper latch 110 engageable with the greenhouse frame and a lower latch 114 engageable with a fixed channel piece 116 attached to curb 6 which when latched retain the door in its closed position.

While prior known devices have employed fixed panels at the corners of greenhouses, the inclusion of such panels makes it difficult to install or remove curtain means without removal of the fixed panels. However, the doors 100 and 102 can be easily swung on their hinge support out of the way for installing or removing the curtains. Moreover, the doors prevent the wind from entering the interior of the greenhouse when the curtains are in their closed (lower) positions. It should be noted that the lower curtain is not illustrated in FIG. 5 for the sake of clarity. It should also be noted that corner closure door 102 is identical to door 100, with the exception of the fact that door 102 is of greater height due to the fact that it is on an end wall, which is a greater height than the side wall with which door 100 is associated.

It should be understood that the invention is not limited to the disclosed embodiments. For example, the invention could be employed with a single curtain or with three or more curtains in a wall. Other changes may also be made without departing from the spirit of the invention, which is to be defined solely by the following claims.

What is claimed is:

1. A greenhouse having an open side, said greenhouse including a plurality of flexible curtains provided in said open side, each of said curtains having vertical end edges, a stationary, fixedly supported upper edge, a substantially horizontal lower end termination, and elevation adjustment means for adjusting the vertical position of said lower end terminations between upper and lower limit positions and first and second weather seal means each comprising an inclined surface extending transversely across the open side of the greenhouse at a respective one of said lower limit positions beneath a respective one of said lower end terminations so as to be automatically operable by movement of said lower end terminations into their respective lower limit positions for engaging said inclined surfaces for preventing the ingress of rain or wind into the greenhouse in the area adjacent said lower end termination.

2. The greenhouse of claim 1, wherein said substantially horizontal lower end terminations each comprise the lower portions of a horizontal roll component of the material forming each respective curtain.

3. A greenhouse having an open side, said greenhouse including a plurality of flexible curtains provided in said open side, each of said curtains having vertical end edges, a stationary, fixedly supported upper edge, a substantially horizontal lower end termination, elevation adjustment means for adjusting the vertical position of said lower end terminations between upper and lower limit positions, weather seal means automatically operable by movement of said lower end terminations into their respective lower limit positions for preventing the ingress of rain or wind into the greenhouse in the area adjacent said lower end terminations, and respective closure door means provided adjacent said end edges and positioned for movement between a first position overlying a respective end edge and a second non-overlying position relative to its respective curtain and including vertical seal means engageable with said curtains when said closure door is in its closed position so as to preclude the ingress of rain or wind around the end edge of said curtain.

4. A greenhouse having an open side, said greenhouse including a plurality of flexible curtains provided in said open side, each of said curtains having vertical end edges, a stationary, fixedly supported upper edge, a substantially horizontal lower end termination, elevation adjustment means for adjusting the vertical position of said lower end terminations between upper and lower limit positions and weather seal means automatically operable by movement of said lower end terminations into their respective lower limit positions for preventing the ingress of rain or wind into the greenhouse in the area adjacent said lower end terminations, wherein said substantially horizontal lower end terminations each comprise the lower portions of a horizontal roll component of the material forming each respective curtain, and said curtains are oriented vertically one beneath the other such that the upper extent of a lower curtain is located beneath the lower extent of an immediately adjacent upper curtain when said upper curtain is in a fully lowered position defined by the lower limit position of the upper curtain.

5. The greenhouse of claim 4, additionally including a plurality of fixed stop members, footer means positioned below the lower curtain for establishing said lower limit position of travel for the lower end termination of said lowermost curtain, said footer means being located vertically beneath said lower curtain and extending the length thereof and whereas said weather seal means includes an inclined surface on said footer means against which the horizontal roll component of the lower curtain is pressed as a consequence of downward movement of the roll component.

6. The greenhouse of claim 4, additionally including a horizontal lower side curtain support channel beam which fixedly supports the upper edge of said lower curtain and which includes an inclined upper surface defining the weather seal means for the upper curtain and against which the horizontal roll component of the upper curtain is pressed to provide said weather seal function as a consequence of downward movement of the roll component into its lower limit position and reaction with said fixed stop members.

7. A greenhouse having an open side, said greenhouse including a plurality of flexible curtains provided in said open side, each of said curtains having vertical end edges, a stationary, fixedly supported upper edge, a substantially horizontal lower end termination, and elevation adjustment means for adjusting the vertical position of said lower end terminations between upper and lower limit positions and weather seal means comprising an inclined surface extending transversely across the open side of the greenhouse and being automatically operable by movement of said lower end terminations into their respective lower limit positions for engaging said inclined surfaces for preventing the ingress of rain or wind into the greenhouse in the area adjacent said lower end termination, and wherein said means for adjusting the vertical position of said lower end terminations of said curtains includes a travelling spindle means mounted in each roll component for rotating said roll component of said curtains, thereby rolling the respective curtains either onto or off of their respective roll component to respectively increase or decrease the elevation of the respective roll component.

8. The greenhouse of claim 7, wherein said spindle means extend substantially the width of said curtains and wherein said elevation adjustment means additionally includes a spool assembly including:

a) a first drum having an inner end and an outer end;

b) a second drum, of smaller diameter than said first drum, having inner and outer ends and a rotational surface concentric with its axis and which is attached coaxially to said spindle means and said first drum; and c) cable means having a first portion rolled on said first drum, a second portion rolled on said second drum, an outer end portion extending from said second drum and connected at its outer extent to a fixed anchor, and an inner end portion connected to selectively actuable force exerting means which when actuated exerts force on the inner end portion of said cable which causes said cable to rotate said spool to cause said spindle to rotate in a direction causing said roll to move upwardly of said curtain to increase the elevation of said roll.

9. The greenhouse of claim 8, further including first and second pulley means respectively positioned between said force exerting means and a respective one of said rolls and over which the inner end portion of the cable extends, said pulley means being positioned vertically above said respective roll so that force exerted by said cable on said spool is in a vertical direction.

10. The greenhouse of claim 9, wherein said selectively actuable force exerting means comprises winch means.

11. The greenhouse of claim 10, wherein said spool includes an opening in the inner end of said first drum, with a connecting portion of said cable extending from said first drum through said opening onto said second drum.

12. The greenhouse of claim 11, wherein said first and second drums have retaining means comprising plural flanges for retaining said cable on said drums.

13. The greenhouse of claim 8, additionally including a plurality of vertically extending internal curtain retainer rods fixedly positioned inwardly of, and adjacent to, said rolls and a plurality of vertically extending external curtain retainer rods fixedly positioned outwardly of said rolls so that said internal and external curtain retainer rods cooperate to restrict inward and outward wind blown or other movement of said rolls and wherein said fixed stop members comprise portions of said vertically extending external curtain retainer rolls.

14. A greenhouse having an open side, said greenhouse including a plurality of flexible curtains provided in said open side, each of said curtains having vertical end edges, a stationary, fixedly supported upper edge, a substantially horizontal lower end termination, and elevation adjustment means for adjusting the vertical position of said lower end terminations between upper and lower limit positions and weather seal means automatically operable by movement of said lower end terminations into their respective lower limit positions for preventing the ingress of rain or wind into the greenhouse in the area adjacent said lower end termination, wherein said curtains are oriented vertically one beneath the other such that the upper extent of a lower curtain is located beneath the lower extent of an immediately adjacent upper curtain when said upper curtain is in its lower limit position, and wherein said substantially horizontal lower end terminations each comprise the lower portions of a horizontal roll component of the material forming each respective curtain.

15. The greenhouse of claim 14, additionally including a plurality of fixed stop members, footer means positioned below the lower curtain for establishing said lower limit position of travel for the lower end termination of said curtain, said lower footer means being located vertically beneath said curtain and extending the length thereof and whereas said weather seal means includes an inclined surface on said footer means against which the horizontal roll component of the lower curtain is pressed as a consequence of downward movement of the roll component and reaction with said plurality of fixed stop members.

16. The greenhouse of claim 14, wherein said means for adjusting the vertical position of said lower end terminations of said curtains includes a traveling spindle means in each roll component on which the roll component is mounted for rotating said roll component of said curtain, thereby rolling the curtain either onto or off of said roll component to respectively increase or decrease the elevation of the roll.

17. The greenhouse of claim 16, wherein said spindle means extends substantially the width of said curtains and wherein said elevation adjustment means additionally includes a spool assembly including:

a) a first drum;

b) a second drum, of smaller diameter than said first drum, having anterior and distal ends and a rotational surface concentric with its axis and which is attached coaxially to said spindle means and said first drum; and c) cable means having a first portion rolled on said first drum, a second portion rolled on said second drum, an outer end portion extending from said second drum and connected at its outer extend to a fixed anchor, and an inner end portion connected to selectively actuable force exerting means which when actuated exerts force on the inner end portion of said cable which causes said cable to rotate said spool to cause said spindle to rotate in a direction causing said roll to move upwardly of said curtain to increase the elevation of said roll.

18. The greenhouse of claim 17, further including pulley means positioned between said force exerting means and said roll and over which the inner end portion of the cable extends, said pulley means being positioned vertically above said spindle so that force exerted by said cable on said spool is in a vertical direction, wherein said force transfer means is in tension.

19. A flexible curtain assembly including: a curtain formed of flexible curtain material having a stationary, fixedly supported upper edge, a substantially horizontal lower end comprising a roll component of the curtain material and vertical end edges, elevation adjustment means for adjusting the vertical position of said lower end between upper and lower limit positions and first and second weather seal means each comprising an inclined surface extending transversely across the open side of the greenhouse at said lower limit position beneath a respective one of said lower end roll components so as to be automatically operable in response to movement of said roll component into said lower limit position in which it engages the inclined surface for preventing the movement of rain or wind beneath and inwardly beyond its respective roll component.

20. The flexible curtain assembly of claim 19, wherein said elevation adjustment means includes a travelling spindle means which extends substantially the entire width of said curtain with said roll component being coaxially mounted on and supported by said spindle and wherein said elevation adjustment means additionally includes a spool including:

a) a first drum, of larger diameter than said spindle, having anterior and distal ends and a rotational surface concentric with its axis, attached coaxially to one end of said spindle means; and b) a second drum, of smaller diameter than said first drum, having anterior and distal ends and a rotational surface concentric with its axis, attached coaxially to said spindle means and said first drum; and c) cable means having a first portion rolled on said first drum, a second portion rolled on said second drum, an outer end portion extending from said second drum and connected at its outer extend to a fixed anchor, and an inner end portion connected to selectively actuable force exerting means which when actuated exerts force on the inner end portion of said cable which causes said cable to rotate said spool to cause said spindle to rotate in a direction causing said roll to move upwardly of said curtain to increase the elevation of said roll.

21. The flexible curtain assembly of claim 20, further including pulley means positioned between said force exerting means and said roll and over which the inner end portion of the cable means extends, said pulley being positioned vertically above said spindle so that force exerted by said cable on said spool is in a vertical direction.

22. The flexible curtain assembly of claim 20, wherein said selectively actuable force exerting means comprises winch means.

23. A building having at least one open side having an upper extent and a lower extent, a horizontal frame component provided along the upper extent of said open side, an upper flexible curtain having an upper edge attached to said horizontal frame component and a lower extent defined by a horizontal roll of the material forming said curtain, a lower curtain support channel beam extending horizontally lengthwise of said open side spaced from the upper extent and the lower extent of said open side, and positioned below and in substantial vertical alignment with said upper flexible curtain and including a canted upper surface, a lower flexible curtain having an upper edge attached to said lower curtain support channel beam and a lower extent defined by a horizontal roll of the material forming said lower curtain, means for rolling or unrolling said horizontal rolls so as to adjust the vertical position of the lower extent of said curtains, fixedly positioned stop means positioned adjacent to said canted upper surface to define a nip with said canted surface into which the horizontal roll of the upper flexible curtain can be lowered to define its lowermost possible position while simultaneously engaging said canted surface to provide a weather seal for inhibiting the passage of wind and precipitation into the building.

24. A building as recited in claim 23 wherein said stop means comprises a plurality of external vertical curtain retainer rods each extending substantially the full vertical height of said open side of the greenhouse externally of said curtains.

25. A building as recited in claim 24 additionally including a vertical closure door provided adjacent each end of said open side and movable between a first position overlying said curtains for inhibiting the flow of wind around the ends of the curtains and an open position permitting access to the end portions of the curtains.

26. The flexible curtain assembly of claim 19, wherein said elevation adjustment means comprises travelling spindle means for rotating said roll component of curtain material, thereby rolling the curtain either onto or off of said roll component to respectively increase or decrease the elevation of the roll.

27. The flexible curtain assembly of claim 26, further including a vertical closure door means and having an inner vertical edge and an outer vertical edge and being mounted at its inner vertical edge for pivotal movement about a vertical axis between a closed position, with its outer edge overlying said curtain in parallel relation thereto so as to preclude outward movement of said curtain and an open position completely clear of said curtain so that said curtain can be moved outwardly beyond said door.

* * * * *